United States Patent
Darby (10) Patent No.: US 10,920,729 B2
(45) Date of Patent: Feb. 16, 2021

(54) METHOD AND SYSTEM FOR TESTING OPERATION OF SOLENOID VALVES

(71) Applicant: PRATT & WHITNEY CANADA CORP., Longueuil (CA)

(72) Inventor: Michael Darby, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 330 days.

(21) Appl. No.: 15/427,160

(22) Filed: Feb. 8, 2017

(65) Prior Publication Data
US 2018/0223785 A1    Aug. 9, 2018

(51) Int. Cl.
| | |
|---|---|
| *F02M 65/00* | (2006.01) |
| *F16K 37/00* | (2006.01) |
| *F02C 7/232* | (2006.01) |
| *F16K 31/06* | (2006.01) |

(52) U.S. Cl.
CPC ....... *F02M 65/001* (2013.01); *F16K 37/0091* (2013.01); *F02C 7/232* (2013.01); *F05D 2260/83* (2013.01); *F16K 31/06* (2013.01)

(58) Field of Classification Search
CPC .. F16K 37/00; F16K 37/0091; F16K 37/0075; F05D 2260/83
USPC .................................. 73/114.46–51
See application file for complete search history.

(56) References Cited

U.S. PATENT DOCUMENTS

| | | | | |
|---|---|---|---|---|
| 4,002,065 A | * | 1/1977 | Lardi | F01D 17/24 73/168 |
| 5,633,458 A | * | 5/1997 | Pauli | F02D 41/22 701/105 |
| 5,646,600 A | * | 7/1997 | Abdel-Malek | F16K 37/0075 251/129.15 |
| 5,665,898 A | * | 9/1997 | Smith | F16K 37/0091 251/26 |
| 5,677,500 A | * | 10/1997 | Ackerley | F17D 1/075 700/301 |
| 5,685,268 A | * | 11/1997 | Wakemen | F02B 77/088 123/198 D |
| 5,713,240 A | * | 2/1998 | Engelmann | F16K 15/035 73/168 |
| 5,746,435 A | * | 5/1998 | Arbuckle | F16K 37/0091 277/304 |

(Continued)

FOREIGN PATENT DOCUMENTS

| | | |
|---|---|---|
| GB | 2498650 | 7/2013 |
| WO | 0159346 | 8/2001 |
| WO | 2015106153 | 7/2015 |

OTHER PUBLICATIONS

Extended European Search Report dated Jun. 13, 2018 in connexion with European patent application No. 18155837.0.

*Primary Examiner* — Nathaniel J Kolb
(74) *Attorney, Agent, or Firm* — Norton Rose Fulbright Canada LLP (57) ABSTRACT

There are described methods and systems for testing operation of a solenoid valve in a control system. A valve command is sent to successively open and close a solenoid valve. A flow command from a control system is monitored to detect a change in the flow command in response to the valve command. The flow command is associated with regulation of fluid flow in a process controlled by the control system. Operation of the solenoid valve is confirmed when the change in flow command is detected.

16 Claims, 8 Drawing Sheets

(56) References Cited

U.S. PATENT DOCUMENTS

| | | | | |
|---|---|---|---|---|
| 5,747,684 A * | 5/1998 | Pace | ............... | F02M 65/00 73/114.49 |
| 5,762,475 A * | 6/1998 | Maddock | ............... | E02F 9/2246 417/29 |
| 5,769,390 A * | 6/1998 | Ando | ............... | F16K 31/046 251/129.05 |
| 5,809,446 A * | 9/1998 | Visser | ............... | F02M 65/00 701/102 |
| 5,811,671 A * | 9/1998 | Seekircher | ............... | F02M 65/00 73/114.45 |
| 5,906,374 A * | 5/1999 | Arbuckle | ............... | F16K 37/0091 277/304 |
| 5,983,714 A * | 11/1999 | Izumiura | ............... | F02D 41/222 73/114.37 |
| 6,019,126 A * | 2/2000 | Kelada | ............... | F16K 37/0091 137/493.8 |
| 6,041,814 A * | 3/2000 | Kouketsu | ............... | F16K 31/1221 137/488 |
| 6,053,193 A * | 4/2000 | Baker, Jr. | ............... | F16K 37/0091 137/14 |
| 6,058,956 A * | 5/2000 | Baker, Jr. | ............... | F16K 27/003 137/1 |
| 6,076,504 A * | 6/2000 | Stavnheim | ............... | F02D 41/221 123/447 |
| 6,125,869 A * | 10/2000 | Horiuchi | ............... | F16K 37/0091 137/1 |
| 6,202,680 B1 * | 3/2001 | Irokawa | ............... | F16K 37/00 137/2 |
| 6,311,553 B1 * | 11/2001 | Schoffel | ............... | F02M 65/00 73/114.48 |
| 6,327,898 B1 * | 12/2001 | Harris | ............... | F02M 25/0818 73/49.2 |
| 6,363,314 B1 * | 3/2002 | Hafner | ............... | F02D 41/20 123/446 |
| 6,408,676 B1 * | 6/2002 | Stratton | ............... | F15B 11/165 73/1.72 |
| 6,422,257 B1 * | 7/2002 | Baker, Jr. | ............... | F16K 37/0091 137/14 |
| 6,526,948 B1 * | 3/2003 | Stavnheim | ............... | F02D 41/221 123/497 |
| 7,692,335 B2 | 4/2010 | Michalko | | |
| 7,828,008 B1 * | 11/2010 | Beckman | ............... | F16K 37/0091 137/487.5 |
| 7,971,499 B2 | 7/2011 | Herlihy et al. | | |
| 9,021,869 B2 * | 5/2015 | Chalaud | ............... | F02C 7/22 73/112.01 |
| 9,470,604 B2 * | 10/2016 | Javelot | ............... | G01M 15/042 |
| 9,810,345 B2 * | 11/2017 | Prescott | ............... | H04L 47/52 |
| 2011/0160917 A1 | 6/2011 | Snowbarger | | |
| 2013/0186096 A1 * | 7/2013 | Andre | ............... | F02C 9/46 60/772 |
| 2013/0276522 A1 * | 10/2013 | Chalaud | ............... | F02M 65/00 73/114.48 |
| 2014/0360255 A1 * | 12/2014 | Javelot | ............... | G01M 15/042 73/114.38 |
| 2015/0176722 A1 * | 6/2015 | Prescott | ............... | F16K 37/0075 702/33 |
| 2016/0238484 A1 | 8/2016 | Veyrat-Masson et al. | | |
| 2016/0312706 A1 | 10/2016 | Veyrat-Masson et al. | | |
| 2016/0325843 A1 * | 11/2016 | Ripley | ............... | B64D 41/00 |
| 2017/0184215 A1 * | 6/2017 | Junk | ............... | F16K 31/1221 |
| 2017/0234920 A1 * | 8/2017 | Nair | ............... | G01R 31/72 361/209 |
| 2018/0320713 A1 * | 11/2018 | Bargh | ............... | F15B 20/008 |

* cited by examiner

METHOD AND SYSTEM FOR TESTING OPERATION OF SOLENOID VALVES

TECHNICAL FIELD

The disclosure relates generally to the testing of solenoid valves, such as those found in aircraft engine control systems.

BACKGROUND OF THE ART

Solenoid valves can serve different purposes. For example, in an aircraft, an engine control system contains a solenoid that affects the engine by shutting off fuel. On turboprop engines, there is a feather solenoid which is used to position the propeller in a safe position for continued flight.

For safety reasons, it is desired to have redundancy in these components and their controllers. it is also desirable to test the operation of these solenoid valves.

Known techniques for testing the operation of a solenoid valve in an aircraft focus on a measured effect of engine speed or pressure. However, these techniques effectively limit the testing to shut down or start-up of the engine, and only on one channel. There is a need for improvement.

SUMMARY

In accordance with a first broad aspect, there is described a method for testing operation of a solenoid valve. A valve command is sent to successively open and close a solenoid valve. A flow command from a control system is monitored to detect a change in the flow command in response to the valve command. The flow command is associated with regulation of fluid flow in a process controlled by the control system. Operation of the solenoid valve is confirmed when the change in flow command is detected.

In accordance with another broad aspect, there is described a system for testing operation of a solenoid valve. The system comprises a processing unit and a non-transitory computer-readable memory having stored thereon program instructions. The program instructions are executable by the processing unit for sending a valve command to successively open and close a first solenoid valve, monitoring a flow command from a control system to detect a change in the flow command in response to the valve command, the flow command associated with regulation of fluid flow in a process controlled by the control system, and confirming operation of the first solenoid valve when the change in the flow command is detected.

In accordance with yet another broad aspect, there is provided a closed loop system comprising a device that operates using a fluid, a fluid source connected to the device for providing the fluid, at least one solenoid valve controlling flow of the fluid to the device, a controller connected between the device and the at least one solenoid valve, the controller configured for regulating flow from the fluid source to the device through the at least one solenoid valve using a flow command, and a valve testing system configured for applying a valve command to the at least one solenoid valve, monitoring the flow command to detect a change in the flow command in response to the valve command, and confirming operation of the at least one solenoid valve when the change in the flow command is detected.

DESCRIPTION OF THE DRAWINGS

Reference is now made to the accompanying figures in which.

DETAILED DESCRIPTION

Figure 1A:
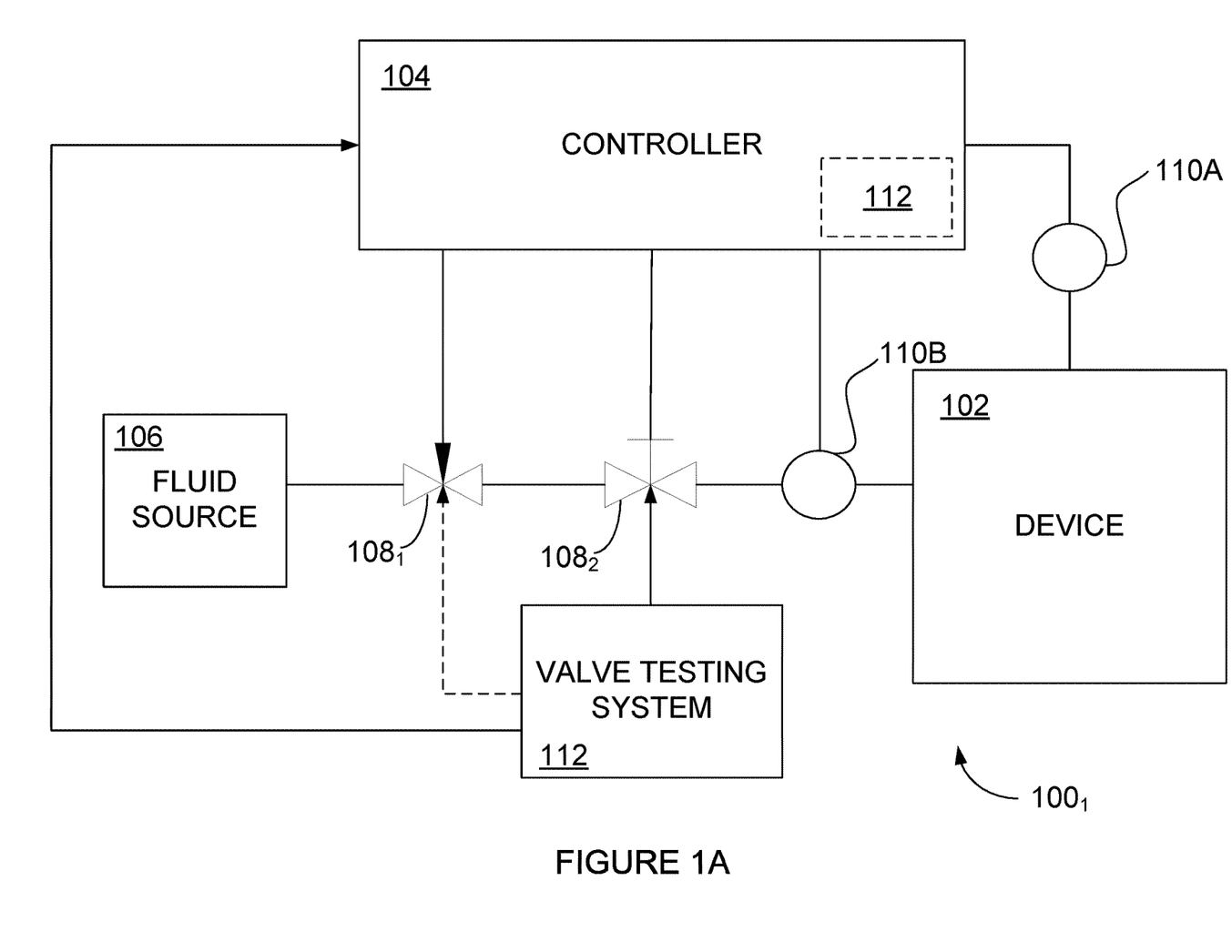
FIGS. 1A-1B are schematic diagrams of example control systems.
Figure 1B:
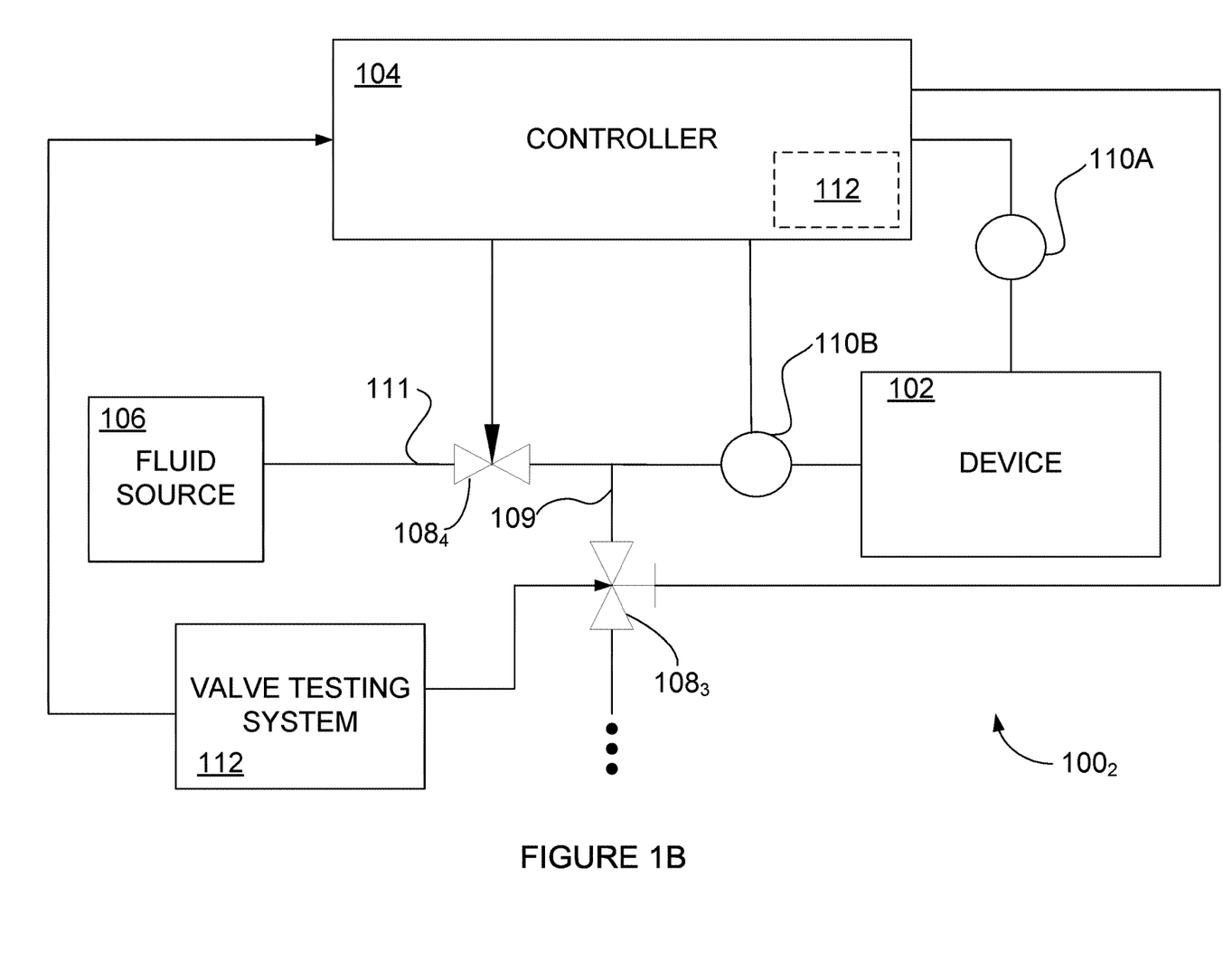

There is described herein systems and methods of testing solenoid operation within a system, such as example systems $100_1$, $100_2$ illustrated in FIGS. 1A and 1B respectively. A device 102 is operational within the system $100_1$, $100_2$. The device 102 may be any type of device that operates using a fluid, such as fuel, oil, and the like. In some embodiments, the system $100_1$ is an engine control system and the device 102 is an engine for an aircraft of a type preferably provided for use in subsonic flight, such as a turboprop engine, a turbo-shaft engine, a turbofan engine, and the like. The device 102 thus operates using fuel. In some embodiments, the system $100_1$ is a propeller control system and the device 102 is a propeller, such as the propeller of a turboprop engine. The device 102 thus operates using oil. In yet other embodiments, the device 102 is an aircraft power plant comprising both an engine that operates on fuel and a propeller that operates on oil. Other embodiments may also apply.

The device 102 is fed fluid by a fluid source 106, which may be a reservoir, a pump, or any other suitable means of providing fluid to the device 102. At least one solenoid valve $108_1$, $108_2$, $108_3$, $108_4$ is operatively connected between the fluid source 106 and the device 102 for controlling flow of fluid there between. In system $100_1$, a regulating valve $108_1$ acts as a flow regulator to maintain correct flow of the fluid to a desired value. A shutoff valve $108_2$ controls flow of the fluid to the device 102. When the shutoff valve $108_2$ is fully opened, all fluid is allowed to flow. When the shutoff valve $108_2$ is partially closed, only part of the fluid will flow therethrough. When the shutoff valve $108_2$ is fully closed, no fluid will flow to the device 102. In system $100_2$, a bypass valve $108_3$ is provided on a bypass pipeline 109 to divert part or all of the fluid from a main pipeline 111. A metering valve $108_4$ is provided to move propeller blades to a desired angle. More or different valves may be provided, depending on the nature of the device 102 and the specific application of the system $100_1$, $100_2$.

A controller 104 is connected between the device 102 and at least one of the solenoid valves $108_1$, $108_2$, $108_3$, $108_4$. The controller 104 is configured for regulating flow of the fluid from the fluid source 106 to the device 102 via the at least one solenoid valve $108_1$, $108_2$, $108_3$, $108_4$. The controller 104 operates in a closed loop in that the control action from the controller 104 is dependent on the desired and actual output from the device 102. For example, if the device 102 is an engine, the controller 104 issues a flow command to a regulating solenoid valve so as to cause the engine to rotate at a desired speed. A feedback from the engine to the controller 104 will indicate what the actual speed of the engine is and the controller 104 will modulate the flow command in order to adjust the actual speed to the desired speed. In another example, if the device 102 is a propeller, the controller 104 issues a flow command to a metering valve to move the propeller blades to a desired angle. A feedback from the propeller to the controller 104 will indicate what the actual blade angle of the propeller is and the controller 104 will modulate the flow command in order to adjust the actual blade angle to the desired blade angle. Feedback may be obtained using one or more measuring devices, such as measuring device 110a which measures a device parameter indicative of an output of the device as a result of the input of fluid, and/or measuring device 110b which measures fluid flow prior to being input into device 102. In some embodiments, the device parameter is engine speed, engine pressure, propeller blade angle, and the like.

A valve testing system is operatively connected to any one of the solenoid valves to be tested. In some embodiments, the valve testing system 112 is permanently connected to a given solenoid valve, such as solenoid valve $108_3$, for example through a hard-wired connection. Alternatively, the valve testing system 112 is configured for selectively connecting to a given solenoid valve, such as solenoid valve $108_1$ or $108_2$. The valve testing system 112 may thus be connected to a given solenoid valve for the duration of the test and subsequently disconnected. For simplicity, the example herein is described with reference to the testing of solenoid valve $108_2$.

Although illustrated as a separate component from the controller 104, the valve testing system 112 may also be provided as a sub-component of the controller 104, for example as a software module, a hardware module, or a combination thereof. In some embodiments, a portion of the valve testing system 112 is integrated inside the controller 104 while a portion is provided externally therefrom. Hardware and/or software resources may be shared between the controller 104 and the valve testing system 112.

Figure 2:
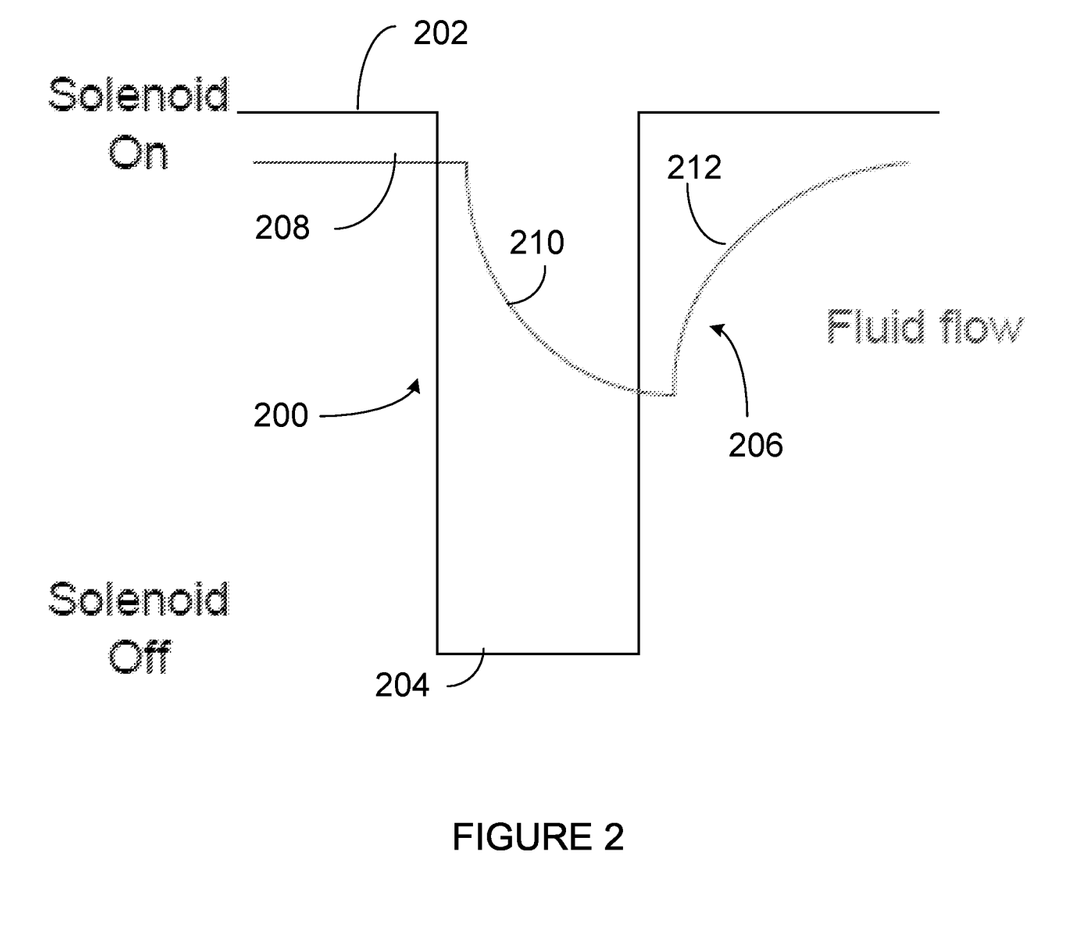
FIG. 2 is a schematic diagram illustrating the effect of solenoid pulsing on fluid flow.

The valve testing system 112 is configured to send a valve command to successively open and close solenoid valve $108_2$ over a given time period, in order to affect a flow of fluid through solenoid valve $108_2$, and thus affect the amount of fluid input to the device 102. Reference is made to FIG. 2, illustrating a portion of an example valve command 200. The high portion 202 of the curve commands the solenoid valve to open, the low portion 204 of the curve commands the solenoid valve to close. In practice, fluid flow through the valve $108_2$ is not instantly affected by the valve command 200. The fluid response has latency and delay due to the electric circuitry of the controller 104 and the slew rate of the valve $108_2$. Curve 206 illustrates an example delayed response of the fluid flow. Portion 208 of curve 206 represents the fluid flow when the valve $108_2$ is fully opened. Portion 210 of curve 206 represents the fluid flow as it decreases once the solenoid valve $108_2$ has been commanded to close. Portion 212 of curve 206 represents the fluid flow as it increases back to the level of portion 208 once the solenoid valve $108_2$ has been commanded to open again.

Figure 3A:
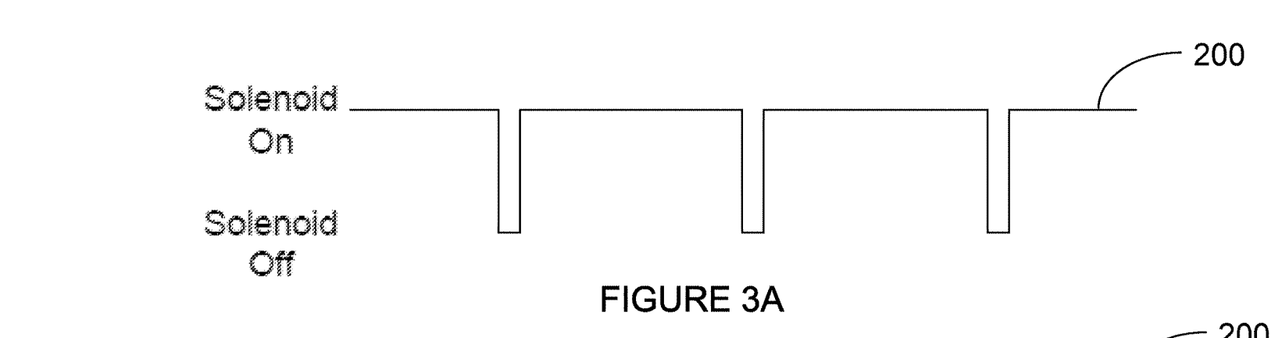
FIGS. 3A-3C are examples of valve commands for opening and closing the solenoid valve in a closed loop control system.
Figure 3B:
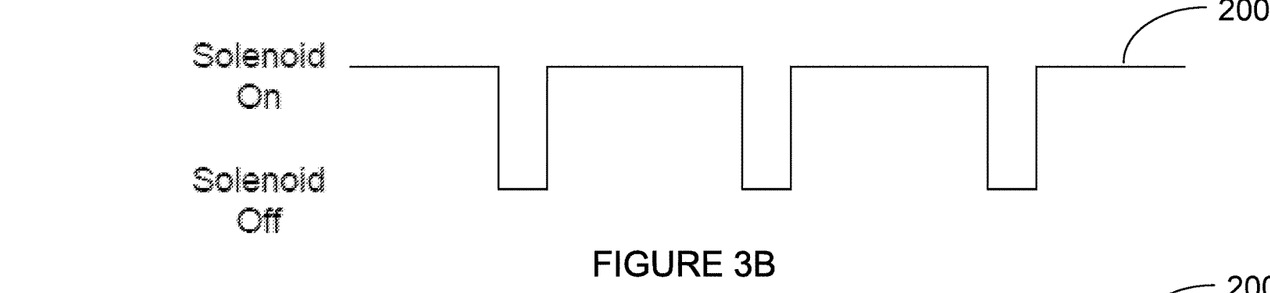
Figure 3C:
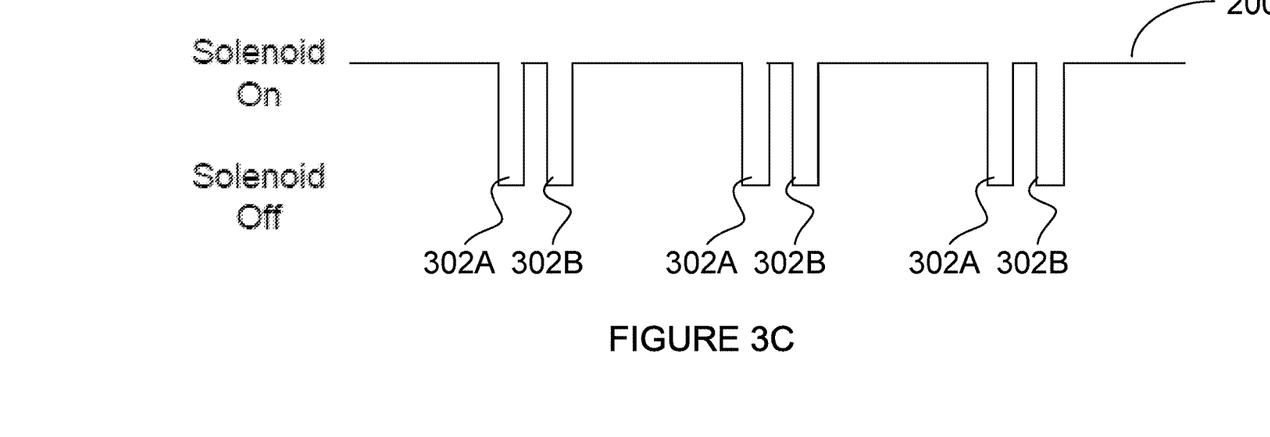

The valve command 200 is modulated to only cause a partial reduction in the flow of fluid. The latency effect of the fluid response is exploited by adjusting the period of the valve command 200. In some embodiments, the valve command 200 comprises separate and successive open and close commands for the valve $108_2$. In some embodiments, the valve command 200 is a pulse width modulated signal, with a given duty cycle. Example valve commands are illustrated in FIGS. 3A-3C. The duty cycle may be set to a value greater than 50% in order to cause the partial reduction in flow. FIG. 3A is an example of a very high duty cycle, such as 90%. FIG. 3B is an example of a lower duty cycle, such as 75%. In some embodiments, the valve command 200 comprises pairs of pulses 302a, 302b, that are spaced apart over time. Various duty cycles and/or periods may be used to affect fluid flow. In some embodiments, the duty cycle and/or period is chosen as a function of the solenoid valve slew rate and/or the storage capacity of the fluid lines.

Figure 4:
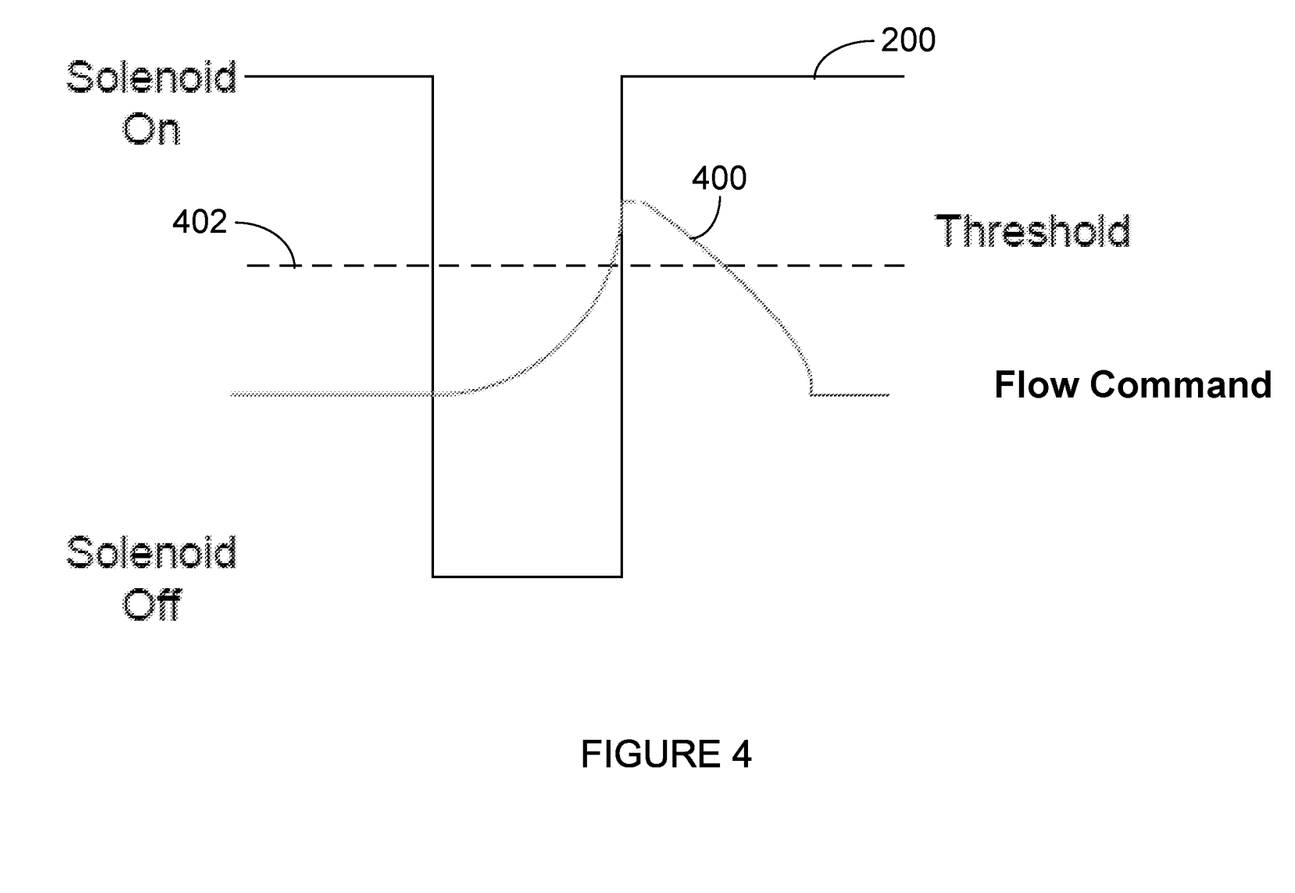
FIG. 4 is a schematic diagram illustrate the effect of solenoid pulsing on a flow command.

The controller 104 operates in a closed loop system, which means it will respond to the partial reduction of the flow of fluid. Indeed, the controller 104 will compensate for a reduction in fluid flow, as measured by measuring device 110b, by increasing a flow command, such as a fuel flow command for an engine or an oil flow command for a propeller. An example is illustrated in FIG. 4, wherein a flow command 400 is overlaid on the valve command 200. A threshold 402 is used as a trigger to detect the change in the flow command 400 and thus confirm operation of the solenoid valve. The threshold may be set lower or higher.

Figure 5A:
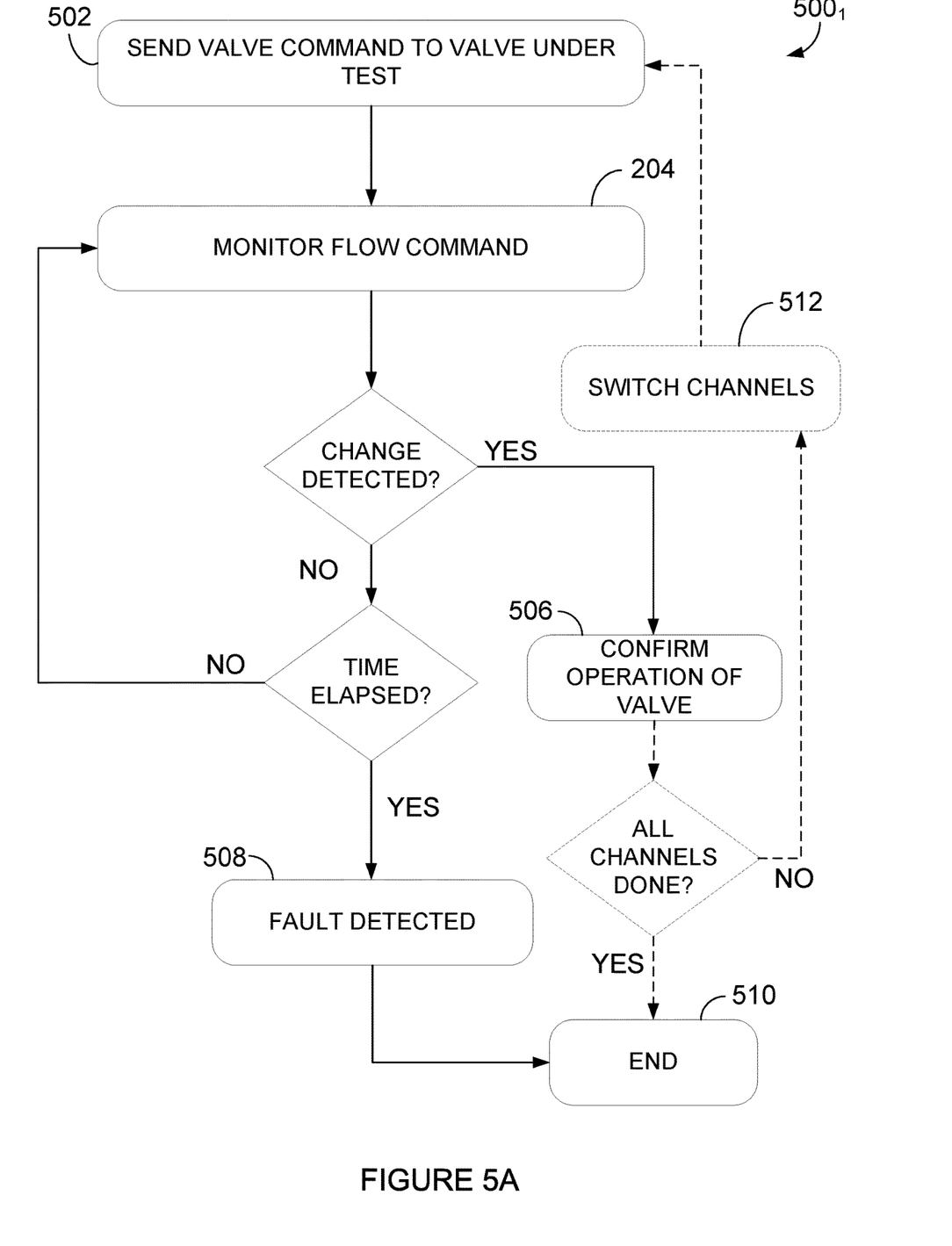
FIGS. 5A-5B are flowcharts of example methods for testing the operation of the solenoid valve.

Turning now to FIG. 5A, there is illustrated a flowchart of an example method $500_1$ for testing operation of a solenoid valve. At 502, the valve command is sent to the valve under test, in order to successively open and close the valve. At 204, the flow command that regulates the flow of fluid is monitored over an allotted time. The allotted time may correspond to the duration of the valve command, or it may be a different amount of time, pre-programmed into the valve testing system 112. In some embodiments, the allotted time is selected as a function of a flow measuring device response time. If a change in the flow command is detected within the allotted time, operation of the valve under test is confirmed at 506. If no change in the flow command is detected within the allotted time, a fault is detected at 508. The method ends at 510 when a fault is detected or operation of the valve is confirmed.

In some embodiments, the method $500_1$ is performed while the engine of the aircraft is operating at idle. Thus, it may be performed anytime during operation of the engine, not only at engine start-up or shutdown, and not necessarily when the aircraft is on the ground. By focusing on the change in flow command, the test can be done while the engine is in operation and the engine can remain in operation after the test. In some embodiments, the method $500_1$ is performed immediately after an engine start, while the engine is at idle and before the aircraft begins operations. In some embodiments, the method $500_1$ is again repeated upon receipt of a shutdown command for the engine.

In some embodiments, the method $500_1$ is repeated for all channels of the controller 104. For example, if the controller 104 is a dual-channel controller, the method $500_1$ will be performed a first time while the controller 104 is set to a first channel of operation. If operation of the valve is confirmed at 506, the method $500_1$ moves on to 512, where the controller 104 is switched to its second channel of operation. The method $500_1$ is then performed a second time to test operation of the valve through the second channel of operation. The method $500_1$ may be repeated as many times as necessary until all channels have been tested.

Figure 5B:
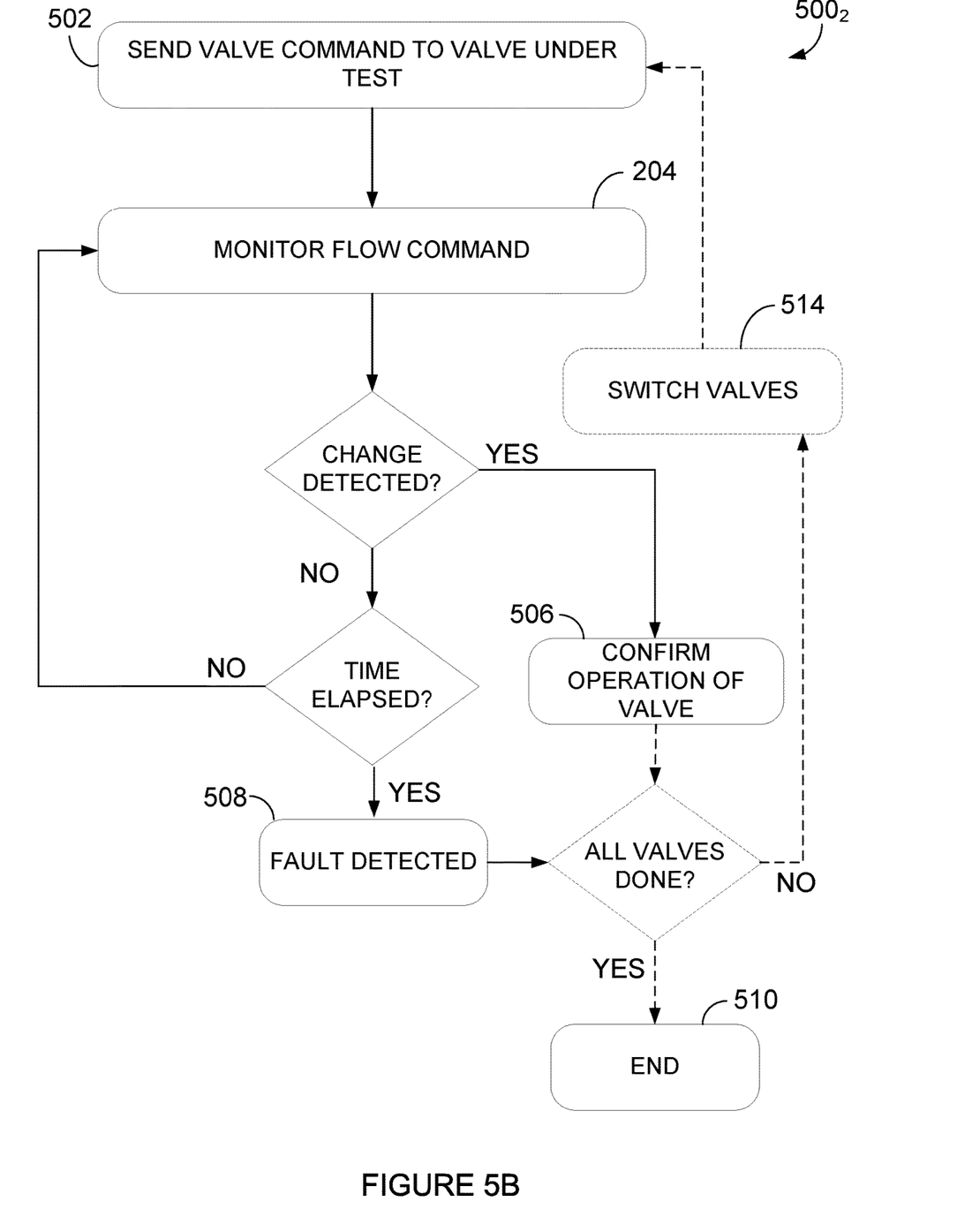

In an alternative embodiment, illustrated as method $500_2$ in FIG. 5B, the method is repeated for multiple valves. In this example, when the first valve has been tested and either a fault is detected at 508 or operation of the first valve is confirmed at 506, the method $500_2$ will continue to 514 where the valve testing system 112 is connected to a second valve. The method $500_2$ will then be repeated for the second valve, and may continue to be repeated until all valves have been tested. Note that the method $500_2$ may also be set to immediately end at 510 as soon as any one of the valves is found to be defective.

As the methods $500_1$, $500_2$ are not dependent on a start-up or shutdown of the engine, they may be repeated as many times as desired without having to repeat engine start-up and/or shutdown, saving considerable time.

Figure 6:
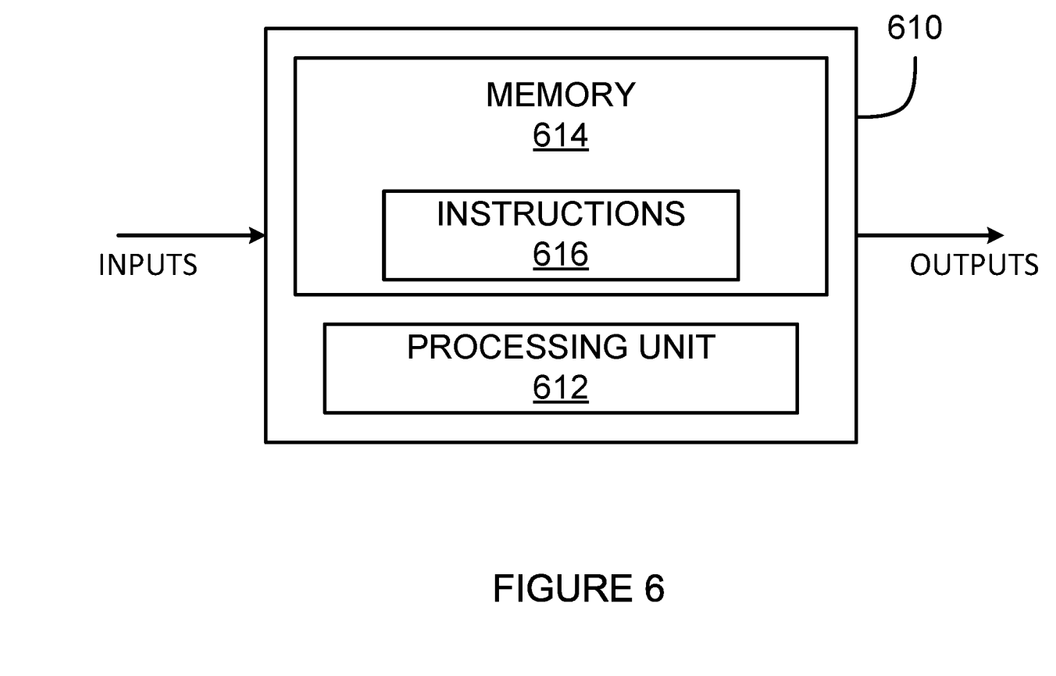
FIG. 6 is a block diagram of an example embodiment of the solenoid valve testing system.

FIG. 6 illustrates an example embodiment to implement the valve testing system 112, so as to perform the methods $500_1$, $500_2$. A computing device 610 comprises a processing unit 612 and a memory 614 which has stored therein computer-executable instructions 616. The processing unit 612 may comprise any suitable devices configured to implement the valve testing system 112 such that instructions 616, when executed by the computing device 610 or other programmable apparatus, may cause the functions/acts/steps attributed to the valve testing system 112 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for testing operation of a solenoid valve described herein may be implemented in a high level procedural or object oriented programming or scripting language, or a combination thereof, to communicate with or assist in the operation of a computer system, for example the computing device 610. Alternatively, the methods and systems for testing operation of a solenoid valve may be implemented in assembly or machine language. The language may be a compiled or interpreted language. Program code for implementing the methods and systems for controlling operation of aircraft engines may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for testing operation of a solenoid valve may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

In some embodiments, the valve testing system 112 forms part of an engine controller, such as a full-authority digital engine control (FADEC), an electronic engine controller (EEC), an engine control unit (ECU), or any other suitable engine controller.

The above description is meant to be exemplary only, and one skilled in the art will recognize that changes may be made to the embodiments described without departing from the scope of the invention disclosed. For example, the valve command may be sent by the controller 104. Still other modifications which fall within the scope of the present invention will be apparent to those skilled in the art, in light of a review of this disclosure, and such modifications are intended to fall within the appended claims.

The invention claimed is:

1. A method for testing operation of a solenoid valve, the method comprising:
   sending a valve command to successively open and close a first solenoid valve, the valve command modulated to cause a partial reduction in a flow of fluid through the first solenoid valve;
   monitoring a flow command from a control system to detect a change in the flow command in response to the valve command, the flow command associated with regulation of the flow of fluid in a process controlled by the control system, wherein the control system is an engine control system in an aircraft; and
   confirming operation of the first solenoid valve when the change in the flow command is detected.

2. The method of claim 1, wherein the flow command is at least one of an engine fuel flow command and a propeller oil flow command.

3. The method of claim 1, wherein the method is performed upon start-up of the engine.

4. The method of claim 3, wherein the method is performed again upon receipt of a shutdown command for the engine.

5. The method of claim 1, further comprising changing an operational channel of the control system to another channel and repeating the method for the other channel.

6. The method of claim 1, further comprising:
   sending the valve command to successively open and close a second solenoid valve;
   monitoring the flow command from the control system to detect the change in the flow command in response to the valve command; and
   confirming operation of the second solenoid valve when the change in the flow command is detected.

7. The method of claim 1, wherein sending a valve command comprises applying a pulse width modulated signal to the first solenoid valve.

8. The method of claim 7, wherein a duty cycle of the pulse width modulated signal is set as a function of a slew rate of the solenoid valve and a storage capacity of fluid lines in the control system.

9. A system for testing operation of a solenoid valve, the system comprising:
   a processing unit; and
   a non-transitory computer-readable memory having stored thereon program instructions executable by the processing unit for:

sending a valve command to successively open and close a first solenoid valve, the valve command modulated to cause a partial reduction in a flow of fluid through the first solenoid valve;

monitoring a flow command from a control system to detect a change in the flow command in response to the valve command, the flow command associated with regulation of the flow of fluid in a process controlled by the control system, wherein the control system is an engine control system in an aircraft; and confirming operation of the first solenoid valve when the change in the flow command is detected.

10. The system of claim 9, wherein the flow command is at least one of an engine fuel flow command and a propeller oil flow command.

11. The system of claim 9, wherein the program instructions are configured for execution upon start-up of the engine.

12. The system of claim 11, wherein the program instructions are configured for execution again upon receipt of a shutdown command for the engine.

13. The system of claim 9, wherein the program instructions are configured for changing an operational channel of the control system to another channel and repeating the method for the other channel.

14. The system of claim 9, wherein the program instructions are configured for:

sending the valve command to successively open and close a second solenoid valve;

monitoring the flow command from the control system to detect the change in the flow command in response to the valve command; and confirming operation of the second solenoid valve when the change in the flow command is detected.

15. The system of claim 9, wherein sending a valve command comprises applying a pulse width modulated signal to the first solenoid valve.

16. The system of claim 15, wherein a duty cycle of the pulse width modulated signal is set as a function of a slew rate of the solenoid valve and a storage capacity of fluid lines in the control system.

* * * * *